United States Patent
Yamamoto et al.

(10) Patent No.: US 10,246,603 B2
(45) Date of Patent: Apr. 2, 2019

(54) COATING MATERIAL COMPOSITION, SOLVENT-BASED COATING MATERIAL, AQUEOUS COATING MATERIAL, POWDER COATING MATERIAL AND COATED ARTICLE

(71) Applicant: AGC Inc., Chiyoda-ku (JP)

(72) Inventors: Hiromasa Yamamoto, Chiyoda-ku (JP); Shun Saito, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 102 days.

(21) Appl. No.: 15/187,199

(22) Filed: Jun. 20, 2016

(65) Prior Publication Data

US 2016/0289483 A1 Oct. 6, 2016

Related U.S. Application Data

(63) Continuation of application No. PCT/JP2015/056857, filed on Mar. 9, 2015.

(30) Foreign Application Priority Data

Mar. 10, 2014 (JP) .................... 2014-046799

(51) Int. Cl.
| | | |
|---|---|---|
| C08K 3/22 | (2006.01) | |
| C08K 5/00 | (2006.01) | |
| C09D 5/02 | (2006.01) | |
| C09D 5/03 | (2006.01) | |
| C09D 7/40 | (2018.01) | |
| C09D 7/41 | (2018.01) | |
| C09D 7/61 | (2018.01) | |
| C08G 18/62 | (2006.01) | |
| C08G 18/79 | (2006.01) | |
| C09D 127/18 | (2006.01) | |
| C09D 129/04 | (2006.01) | |
| C09D 175/04 | (2006.01) | |

(52) U.S. Cl.
CPC ....... *C09D 129/04* (2013.01); *C08G 18/6279* (2013.01); *C08G 18/792* (2013.01); *C08K 5/0091* (2013.01); *C09D 5/02* (2013.01); *C09D 5/03* (2013.01); *C09D 7/40* (2018.01); *C09D 7/41* (2018.01); *C09D 7/61* (2018.01); *C09D 127/18* (2013.01); *C09D 175/04* (2013.01); *C08G 2150/20* (2013.01); *C08K 3/22* (2013.01); *C08K 2003/2241* (2013.01)

(58) Field of Classification Search
CPC .............. C08G 18/6279; C08G 18/792; C08G 2150/20; C09D 7/40; C09D 7/41; C09D 129/04; C09D 127/18; C09D 5/02; C09D 5/03; C09D 7/61; C09D 175/04; C08K 5/0091; C08K 3/22; C08K 2003/2214
USPC ...................................................... 524/315
See application file for complete search history.

(56) References Cited

U.S. PATENT DOCUMENTS

| | | | |
|---|---|---|---|
| 5,352,511 A | 10/1994 | Abayasekara et al. | |
| 5,712,355 A | 1/1998 | Jones | |
| 9,290,595 B2 | 3/2016 | Kodama | |
| 9,868,877 B2 * | 1/2018 | Nakatani | C08K 5/0091 |

FOREIGN PATENT DOCUMENTS

| | | | |
|---|---|---|---|
| JP | 4-336072 | 11/1992 | |
| JP | 7-118599 A | 5/1995 | |
| JP | 9-504995 | 5/1997 | |
| JP | 10-513217 | 12/1998 | |
| JP | 2006-188639 | 7/2006 | |
| JP | 2013-177585 | 9/2013 | |
| WO | WO-2011001833 A1 * | 1/2011 | C08K 5/0091 |

(Continued)

OTHER PUBLICATIONS

Machine Translation for JP 2013-177585. (Year: 2013).*

(Continued)

*Primary Examiner* — Angela C Scott
(74) *Attorney, Agent, or Firm* — Oblon, McClelland, Maier & Neustadt, L.L.P.

(57) ABSTRACT

To provide a coating material composition capable of forming a cured film free from flooding or color separation and excellent in weather resistance, as well as a solvent-based coating material, an aqueous coating material, a powder coating material and a coated article, using such a composition. A coating material composition comprising a fluorinated copolymer (A) and a pigment (B), characterized in that the fluorinated copolymer (A) has units represented by the following formula (1) [X and Y are each independently H, F, $CF_3$ or Cl] and units represented by the following formula (2), the number average molecular weight of the fluorinated copolymer (A) is from 10,000 to 100,000, and the content of the pigment (B) is from 20 to 200 parts by mass, per 100 parts by mass of the fluorinated copolymer (A):

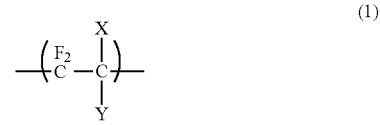

(1)

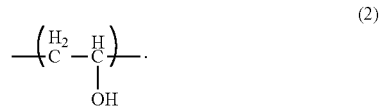

(2)

20 Claims, 1 Drawing Sheet

(56) References Cited

FOREIGN PATENT DOCUMENTS

WO  WO 2012/165503 A1  12/2012
WO  WO 2013/051668 A1  4/2013

OTHER PUBLICATIONS

International Search Report dated Jun. 9, 2015 in PCT/JP2015/056857 filed on Mar. 9, 2015.
"Toryo no Erabikata Tsukaikata", $1^{st}$ edition, $2^{nd}$ print, Japanese Standards Association, 1981, 3 pgs.

* cited by examiner

COATING MATERIAL COMPOSITION, SOLVENT-BASED COATING MATERIAL, AQUEOUS COATING MATERIAL, POWDER COATING MATERIAL AND COATED ARTICLE

TECHNICAL FIELD

The present invention relates to a coating material composition as well as a solvent-based coating material, an aqueous coating material, a powder coating material and a coated article, using the composition.

BACKGROUND ART

Heretofore, it has been proposed to use a fluorinated copolymer obtained by copolymerizing a fluoroolefin, a hydroxyl alkyl vinyl ether and, as the case requires, other monomers, for a coating material. A coating material containing such a fluorinated copolymer is curable at room temperature, and a cured film thereby obtainable has weather resistance, chemical resistance, water/oil repellency, etc. (e.g. Patent Document 1).

PRIOR ART DOCUMENT

Patent Document

Patent Document 1: JP-A-2006-188639

DISCLOSURE OF INVENTION

Technical Problem

However, with the above-mentioned fluorinated copolymer, curing tends to be non-uniform, and the weather resistance of the cured film is inadequate.

Further, the above-mentioned fluorinated copolymer has a low hydroxy value and thus has a small number of functional groups interacting with a pigment, and therefore, a coating material comprising such a fluorinated copolymer and a pigment, has such a problem that flooding or color separation is likely to occur.

Each of flooding and color separation is such a phenomenon that in the cured film, the pigment is separated from other components and localized. A case where there is a difference in the pigment concentration at the surface of the cured film, is called color separation, and a case where there is a difference in the pigment concentration in the direction perpendicular to the surface of the cured film, is called flooding. In the case of color separation, a structure of cells (Bennard cells) is likely to be observed on the surface of the cured film in many cases. Flooding and color separation are likely to be distinctly developed when two or more different types of compounds are used as pigments.

The present invention has been made in view of the above-mentioned situation and has an object to provide a coating material composition capable of forming a cured film free from flooding or color separation and excellent in weather resistance, as well as a solvent-based coating material, an aqueous coating material, a powder coating material and a coated article, using such a composition.

Solution to Problem

The present invention has the following constructions [1] to [14].

[1] A coating material composition comprising a fluorinated copolymer (A) and a pigment (B), characterized in that the fluorinated copolymer (A) has units represented by the following formula (1) and units represented by the following formula (2), the number average molecular weight of the fluorinated copolymer (A) is from 10,000 to 100,000, and the content of the pigment (B) is from 20 to 200 parts by mass, per 100 parts by mass of the fluorinated copolymer (A):

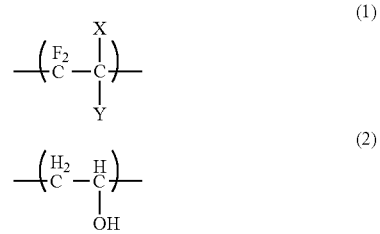

in the formula (1), X and Y are each independently H, F, $CF_3$ or Cl.

[2] The coating material composition according to the above [1], wherein in the formula (1), X is F, and Y is F or Cl.

[3] The coating material composition according to the above [1] or [2], wherein two or more types of the pigment (B) are used in combination.

[4] The coating material composition according to any one of the above [1] to [3], wherein the hydroxy value of the fluorinated copolymer (A) is at least 100 mgKOH/g.

[5] The coating material composition according to any one of the above [1] to [4], wherein to the total of all units in the fluorinated copolymer (A), the units represented by the formula (1) are from 20 to 80 mol %, and the units represented by the formula (2) are from 80 to 20 mol %.

[6] The coating material composition according to any one of the above [1] to [5], wherein in the fluorinated copolymer (A), the molar ratio of the units represented by the formula (1) to the units represented by the formula (2) (i.e. units (1)/units (2)) is from 40/60 to 60/40.

[7] The coating material composition according to any one of the above [1] to [6], wherein in the fluorinated copolymer (A), the alternating copolymerization ratio of the units represented by the formula (1) and the units represented by the formula (2), is at least 95%.

[8] The coating material composition according to any one of the above [1] to [7], which further contains a curing agent (C).

[9] The coating material composition according to any one of the above [1] to [8], which further contains an organic solvent.

[10] The coating material composition according to the above [9], wherein the organic solvent is a compound containing a carbonyl group.

[11] The coating material composition according to any one of the above [1] to [8], which further contains an aqueous medium.

[12] The coating material composition according to any one of the above [1] to [7], which is a one-liquid type coating material composition further containing an organic solvent and not containing a curing agent (C) or a curing catalyst (D).

[13] A powder coating material comprising the coating material composition as defined in any one of the above [1] to [8].

[14] A coated article having a cured film formed from the coating material composition as defined in any one of the above [9] to [12] or the powder coating material as defined in the above [13], on a surface of a substrate.

Advantageous Effects of Invention

The solvent-based coating material, the aqueous coating material or the powder coating material, containing the coating material composition of the present invention, is capable of forming a cured film free from flooding or color separation and excellent in weather resistance.

Further, the cured film which the coated article of the present invention has, is free from flooding or color separation and excellent in weather resistance.

DESCRIPTION OF EMBODIMENTS

Figure 1:
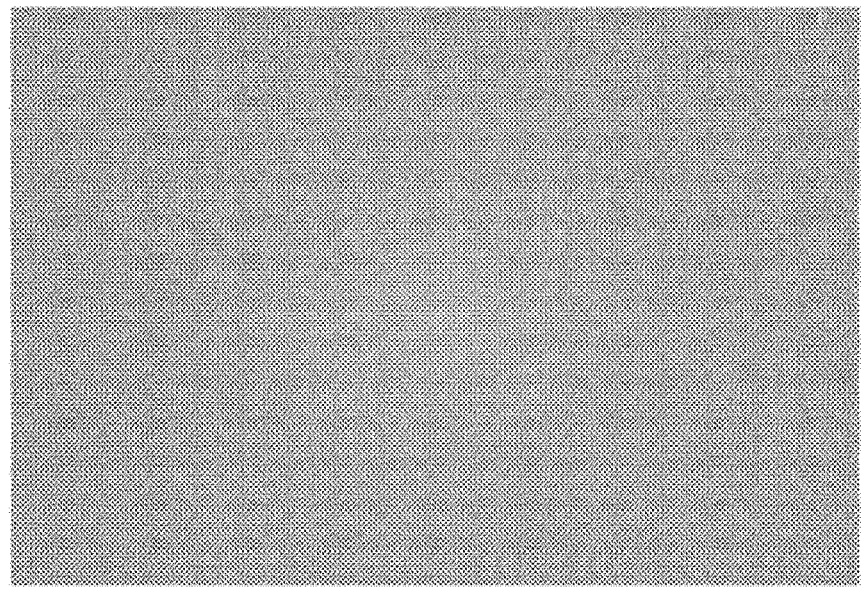
FIG. 1 is a microscopic image (500 magnifications) showing the result of evaluation of flooding/color separation resistance in Example 1.

In the present invention, a "unit" means a moiety derived from a monomer, which is present in a polymer to constitute the polymer. A unit derived from a monomer having a carbon-carbon unsaturated double bond, formed by addition polymerization of the monomer, is a divalent unit formed by cleavage of the unsaturated double bond. Further, one having a certain structure chemically changed after formation of a polymer, is also referred to as a unit.

A "fluorinated resin" means a high molecular weight polymer having fluorine atom(s) in its molecule.

A "non-fluorinated resin" means a high molecular weight polymer having no fluorine atoms in its molecule.

[Coating Material Composition]

The coating material composition of the present invention comprises a fluorinated copolymer (A) and a pigment (B).

The coating material composition of the present invention may contain a curing agent (C), a curing catalyst (D), another polymer (E), a medium (F) such as an organic solvent, water or the like, another component (G) other than these, etc., as the case requires.

The coating material composition of the present invention is capable of forming a cured film by curing, as hydroxy groups which the fluorinated copolymer (A) has, are reacted with one another to form cross-linking structures, or as such hydroxy groups and a curing agent (C) optionally incorporated, are reacted to form cross-linking structures.

The coating material composition of the present invention may be a solvent-based coating material composition, an aqueous coating material composition or a powder coating material composition.

In the case of a solvent-based coating material composition, the coating material composition of the present invention preferably further contains an organic solvent. The coating material composition containing an organic solvent may be used, as it is, as a solvent-based coating material, or one having the above coating material composition mixed with other component(s) may be used as a solvent-based coating material.

In the case of an aqueous coating material composition, the coating material composition of the present invention preferably further contains an aqueous medium. The coating material composition containing an aqueous medium may be used, as it is, as an aqueous coating material, or one having the above coating material composition mixed with other component(s) may be used as an aqueous coating material.

In the case of a powder coating material composition, the coating material composition of the present invention is made in the form of a powder. The powder made of the coating material composition of the present invention may be used, as it is, as a powder coating material, or one having the powder made of the coating material composition of the present invention mixed with other component(s) (such as other powder(s)) may be used as a powder coating material.

(Fluorinated Copolymer (A))

A fluorinated copolymer (A) (hereinafter referred to also as a "copolymer (A)") has units represented by the following formula (1) (hereinafter referred to also as "units (1)") and units represented by the following formula (2) (hereinafter referred to also as "units (2)").

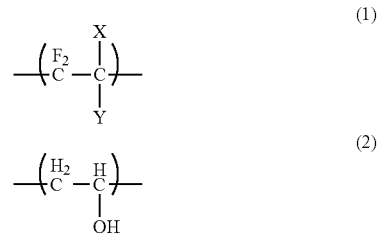

In the formula (1), X and Y are each independently H, F, $CF_3$ or Cl.

From the viewpoint of being excellent in less susceptibility to flooding or color separation (hereinafter referred to also as "flooding/color separation resistance"), the units (1) are preferably units wherein X is F, and Y is F or Cl, particularly preferably units wherein Y is F.

In the copolymer (A), the content of the units (1) is preferably from 20 to 80 mol %, more preferably from 30 to 70 mol %, particularly preferably from 40 to 60 mol %, to the total of all units constituting the copolymer (A). When the content of the units (1) is at least the lower limit value in the above range, the content of fluorine atoms in the copolymer (A) becomes high, whereby the weather resistance will be excellent. When it is at most the upper limit value, the solubility in a solvent and the adhesion of the cured film to the substrate will be excellent.

In the copolymer (A), the content of the units (2) is preferably from 80 to 20 mol %, more preferably from 70 to 30 mol %, particularly preferably from 60 to 40 mol %, to the total of all units constituting the copolymer (A). When the content of the units (2) is at least the lower limit value in the above range, the amount of hydroxy groups in the copolymer (A) becomes large, whereby the adhesion to the substrate, the curing properties, the flooding/color separation resistance, etc. will be excellent. When it is at most the upper limit value, the curing rate and the curing amount will be proper, whereby a uniform cured film can be formed.

In the copolymer (A), the molar ratio of the units (1) to the units (2) (units (1)/units (2)) is preferably from 40/60 to 60/40, more preferably from 45/55 to 55/45, particularly preferably 50/50.

The smaller the difference between the content of the units (1) and the content of the units (2), the better the flooding/color separation resistance, the weather resistance, etc.

The copolymer (A) may further contain other units than the units (1) and the units (2), within a range not to impair the effects of the present invention.

As such other units, units based on the following monomers may, for example, be mentioned. One type of these monomers may be used alone, or two or more types of them may be used in combination.

Hydroxybutyl vinyl ether, hydroxyethyl vinyl ether, 2-hydroxybutyl allyl ether, 2-hydroxyethyl ally ether, ethyl vinyl ether, butyl vinyl ether, cyclohexyl vinyl ether, ethylene, propylene, vinyl acetate, ally acetate, vinyl propionate, maleic anhydride, itaconic anhydride, etc.

The copolymer (A) may be any of a random copolymer, an alternate copolymer and a block copolymer.

The copolymer (A) is preferably an alternate copolymer. When the copolymer (A) is an alternate copolymer, the weather resistance of the cured film will be particularly excellent. Further, the flooding/color separation resistance will also be improved.

The alternate copolymerization ratio of the units (1) and the units (2) in the copolymer (A) is preferably at least 95%, more preferably from 95 to 100%, particularly preferably from 97 to 100%, from the viewpoint of the weather resistance, the flooding/color separation resistance, etc.

The alternate copolymerization ratio is a ratio of the number of combinations wherein different units are adjacent to each other, to the total number of combinations of adjacent two units. For example, in a case where the copolymer is a copolymer represented by 12122121212 (where 1 represent a unit (1), 2 represents a unit (2)), the number of combinations of adjacent two units is 10, and the number of combinations wherein different units are adjacent to each other is 9, and therefore, the alternate copolymerization ratio is 90%. Here, in a case where the polymer contains other monomers, only two types of units i.e. one type being the largest in number and another type being the second largest in number, are taken into consideration, and other units inserted among them shall be excluded from calculation.

The alternate copolymerization ratio can be calculated by the Monte Carlo method from the polymerization reactivity ratios of a plurality of monomers to be used for the synthesis of the copolymer. The alternate copolymerization ratio may be adjusted by combination of monomers. The lower and the closer the polymerization reactivities of the respective monomers are, the higher the alternate copolymerization ratio becomes.

The number average molecular weight (Mn) of the copolymer (A) is from 10,000 to 100,000, preferably from 10,000 to 90,000, more preferably from 10,000 to 80,000, particularly preferably from 10,000 to 75,000. When the number average molecular weight is at least the lower limit value in the above range, intertwining among molecular chains is sufficiently secured, whereby it is possible to form a tough cured film. When it is at most the upper limit value, the solubility in an organic solvent, the flowability during forming, etc. will be excellent, whereby it is possible to form a homogeneous cured film.

The molecular weight distribution (mass average molecular weight (Mw)/Mn) of the copolymer (A) is preferably from 1 to 5, particularly preferably from 1 to 3. When the molecular weight distribution is at most the upper limit value in the above range, the gel content is small, whereby it is possible to obtain a uniform cured film.

The number average molecular weight (Mn), the mass average molecular weight (Mw) and the molecular weight distribution (Mw/Mn) are measured by gel permeation chromatography (GPC) of size exclusion chromatography (SEC) using polystyrene standards.

The hydroxy value of the copolymer (A) is preferably at least 100 mgKOH/g, more preferably from 100 to 500 mgKOH/g, particularly preferably from 150 to 450 mgKOH/g. When the hydroxy value of the copolymer (A) is at least 100 mgKOH/g, the adhesion to a substrate, the curability, the flooding/color separation resistance, etc. will be excellent. When the hydroxy value of the copolymer (A) is at most the upper limit value in the above range, the curing rate, the curing amount, etc. will be proper, whereby it is possible to form a homogeneous cured film.

The hydroxy value of the copolymer (A) can be adjusted by the content of the units (2), the content of units other than the units (1) and the units (2), etc.

The hydroxy value of the copolymer (A) can be obtained by calculation from a magnetic resonance method or can be measured by a method of acetylating hydroxy groups in the copolymer (A) by using acetic anhydride and titrating excess acetic acid by a potassium hydroxide solution.

The copolymer (A) can be produced by a known method. For example, a copolymer wherein the alternate copolymerization ratio of the units (1) and the units (2) is at least 95%, can be produced in accordance with the method disclosed in WO2012/165503, WO2013/051668, etc. If a desired fluorinated copolymer is commercially available, such a copolymer may be used as the copolymer (A).

One type of the copolymer (A) may be used alone, or two or more types of the copolymer (A) may be used in combination. For example, in a case where the copolymer (A) is an alternate copolymer, one type of the alternate copolymer may be used alone, or two or more types of the alternate copolymer may be used in combination. As the copolymer (A), an alternate copolymer and another copolymer (such as a random copolymer or a block copolymer) may be used in combination.

The copolymer (A) is preferably composed solely of an alternate copolymer, since the weather resistance of the cured film will be thereby particularly excellent.

(Pigment (B))

The pigment (B) is not particularly limited, and various pigments commonly used for e.g. coating materials may be used.

The pigment (B) is preferably at least one member selected from the group consisting of luster pigments, rust prevention pigments, coloring pigments and extender pigments. Particularly in order to obtain coating materials of various colors including white color, it is preferred to incorporate coloring pigments.

A luster pigment is a pigment to luster a cured film. The luster pigment may, for example, be an aluminum powder, a nickel powder, a stainless steel powder, a copper powder, a bronze powder, a gold powder, a silver powder, a mica powder, a graphite powder, a glass flake, a scaly iron oxide powder, etc.

A rust prevention pigment is a pigment to prevent corrosion or modification of a substrate, for a substrate which requires rust prevention. The rust prevention pigment is preferably an environmentally friendly lead-free rust prevention pigment. The lead-free rust prevention pigment may, for example, be zinc cyanamide, zinc oxide, zinc phosphate, calcium magnesium phosphate, zinc molybdate, barium borate, zinc calcium cyanamide, etc.

A coloring pigment is a pigment to color a cured film. The coloring pigment may, for example, be titanium oxide, carbon black, iron oxide, phthalocyanine blue, phthalocyanine green, quinacridone, isoindolinone, benzimidazolone, dioxazine, etc.

As the coloring pigment, it is preferred to employ a pigment excellent in weather resistance.

An extender pigment is a pigment to improve the hardness of a cured film and to increase the thickness of the cured film. Further, by incorporating an extender pigment, when the substrate is cut, the cut surface of the cured film may be made to be clean. The extender pigment may, for example, be talc, barium sulfate, mica, calcium carbonate, etc.

One type of the pigment (B) may be used alone, or two or more types of the pigment (B) may be used in combination. According to the coating material composition of the present invention, when two or more types of the pigment (B) are used in combination, it is possible to obtain a coating film which is uniform and excellent in weather resistance.

(Curing Agent (C))

The curing agent (C) is a compound to cure a polymer by reacting with the above-mentioned curable groups, of the polymer having curable groups, to cross-link the polymer or to increase its molecular weight.

The curing agent (C) has at least two reactive groups capable of reacting to curable groups which the copolymer (A) and the after-described another polymer (E) have.

The curable groups which the copolymer (A) and the after-described another polymer (E) have, may, for example, be hydroxy groups, carboxy groups, amino groups, epoxy groups, alkoxysilyl groups, isocyanate groups, etc.

The reactive groups of the curing agent (C) are selected depending upon e.g. the curable groups which the copolymer (A) and the after-described another polymer (E) have, the application of the coating material composition, etc. For example, when the curable groups are hydroxy groups, the reactive groups of the curing agent (C) are preferably isocyanate groups, blocked isocyanate groups, amino groups, epoxy groups, etc.

In a case where the coating material composition is used for a powder coating material, the reactive groups of the curing agent (C) are preferably reactive groups capable of reacting at the time when the powder coating material is heat-melted, and ones reactive to curable groups of the polymer at room temperature are not preferred. For example, rather than isocyanate groups having a high reactivity at room temperature, blocked isocyanate groups are preferred. The blocked isocyanate groups will become isocyanate groups by detachment of the blocking agent at the time when the powder coating material is heat-melted, and the isocyanate groups will then serve as reactive groups.

As the curing agent (C), known compounds may be employed. For example, an isocyanate-type curing agent, a blocked isocyanate-type curing agent, an amine-type curing agent (such as a melamine resin, a guanamine resin, a sulfonamide resin, an urea resin, an aniline resin, etc.), a β-hydroxyalkylamide-type curing agent, a triglycidyl isocyanurate-type curing agent, etc., may be mentioned.

Since the copolymer (A) has hydroxy groups, the curing agent (C) preferably contains a compound having at least two reactive groups capable of reacting to hydroxy groups. Particularly preferably, it contains at least one member selected from the group consisting of an isocyanate-type curing agent, a blocked isocyanate-type curing agent, an amine-type curing agent and an epoxy-type curing agent, since it is thereby possible to easily form a cured film which has a high hardness and which is excellent in durability such as heat resistance, water resistance, etc., weather resistance, abrasion resistance and impact resistance.

The isocyanate-type curing agent may, for example, be a yellowing-free polyisocyanate, a yellowing-free polyisocyanate modified product, etc.

The yellowing-free polyisocyanate may, for example, be an alicyclic polyisocyanate such as isophorone diisocyanate (IPDI), dicyclohexylmethane diisocyanate (HMDI), etc.; an aliphatic polyisocyanate such as hexamethylene diisocyanate (HDI), etc.

The yellowing-free polyisocyanate modified product may, for example, be the following modified products (c1) to (c4).

(c1) An isocyanurate form of an aliphatic diisocyanate or alicyclic diisocyanate.

(c2) A modified product having a structure represented by —Z—C(=O)—NH—, obtained by modifying an aliphatic diisocyanate or alicyclic diisocyanate by a polyol or polyamine.

(c3) A modified product having a structure represented by —Z—C(=O)—NH—, obtained by modifying some of isocyanate groups in an aliphatic diisocyanate or alicyclic diisocyanate by a polyol or polyamine.

(c4) A modified product made of a mixture of the modified product (c1) and the modified product (c2).

Here, Z in —Z—C(=O)—NH— is an organic group derived from the polyol or polyamine. The number of functional groups which the above polyol or polyamine has, is preferably 2 or 3.

The blocked isocyanate-type curing agent may be one obtained by blocking isocyanate groups of the above-mentioned isocyanate-type curing agent.

Such blocking of isocyanate groups may be carried out by e.g. epsilon caprolactam (E-CAP), methyl ethyl ketone oxime (MEK-OX), methyl isobutyl ketone oxime (MIBK-OX), pyrralidine, triazine (TA), etc.

The amine-type curing agent may, for example, be a melamine resin, a guanamine resin, a sulfonamide resin, an urea resin, an aniline resin, etc. Among them, a melamine resin is preferred in that the curing rate is high.

The melamine resin may specifically be an alkyl etherified melamine resin obtained by alkyl-etherifying a melamine, etc. Among them, a melamine resin substituted by a methoxy group and/or a butoxy group, is preferred.

The epoxy-type curing agent may, for example, be triglycidyl isocyanurate (TGIC), "TM239" (trade name, manufactured by Nissan Chemical Industries, Ltd.) obtained by introducing a methylene group to a glycidyl group moiety of TGIC, "PT-910" (trade name, manufacture by Ciba) being a mixture of a trimellitic acid glycidyl ester and terephthalic acid glycidyl ester, a resin containing epoxy groups, etc.

Since the copolymer (A) has hydroxy groups, an acid anhydride such as succinic anhydride, maleic anhydride or phthalic anhydride may be reacted to some of such hydroxy groups to form carboxy groups, which may then be used as curable groups. When carboxy groups are used as cross-linking groups, the above-mentioned amine-type curing agent or epoxy-type curing agent may suitably be employed.

(Curing Catalyst (D))

The curing catalyst (D) is used to accelerate the curing reaction and to impart excellent chemical properties and physical properties to a cured film. Particularly in order to carry out curing at a low temperature in a short time, it is preferred to incorporate the curing catalyst (D).

As such a curing catalyst (D), a known one may be employed, and it may suitably be selected for use depending upon e.g. the type of the curing agent (C).

For example, in a case where the curing agent (C) is an isocyanate-type curing agent or a blocked isocyanate-type curing agent, the curing catalyst (D) may preferably be a tin catalyst, a zirconium catalyst, etc.

The tin catalyst may, for example, be tin octylate, tributyltin dilaurate, dibutyltin dilaurate, etc.

The zirconium catalyst may, for example, be zirconium chelate, etc. As a commercial product of the zirconium catalyst, "K-KAT XC-4205" (trade name, manufactured by Kusumoto Chemicals, Ltd.) may, for example, be mentioned.

In a case where the curing agent (C) is an amine-type curing agent, the curing catalyst (D) is preferably a blocked acid catalyst.

The blocked acid catalyst may be an amine salt of each of a carboxylic acid, a sulfonic acid, a phosphoric acid, etc. Among them, a higher alkyl-substituted sulfonic acid amine salt, such as a diethanol amine salt or triethylamine salt of p-toluene sulfonic acid, a diethanol amine salt or triethylamine salt of dodecylbenzene sulfonic acid, is preferred.

As the curing catalyst (D), one type may be used alone, or two or more types may be used in combination.

(Another Polymer (E))

Another polymer (E) is a polymer which does not belong to the copolymer (A).

Another polymer (E) may be one having curable groups or one not having curable groups. The curable groups may, for example, be hydroxy groups, carboxy groups, amino groups, epoxy groups, alkoxysilyl groups, isocyanate groups, etc.

Another polymer (E) may, for example, be a fluorinated polymer other than the copolymer (A); or a non-fluorinated resin, such as an acryl resin, a polyester resin, an acrylpolyol resin, a polyesterpolyol resin, an urethane resin, an acrylsilicone resin, a silicone resin, an alkyd resin, an epoxy resin, an oxetane resin or an amino resin.

As another polymer (E), one type may be used alone, or two or more types may be used in combination.

In a case where the coating material composition is a solvent-based coating material composition, another polymer (E) is preferably one which is compatible with the copolymer (A) to form a uniform cured film, whereby the cured film tends to easily have a luster. In such a case, another polymer (E) may be a thermosetting resin or a thermoplastic resin.

In a case where a thermosetting resin is contained as another polymer (E), such another polymer (E) is preferably linkable with the copolymer (A) by a curing agent (C). Specifically, a polyester resin or an aryl resin containing a hydroxy group, an epoxy group, a carbonyl group or the like at a terminal or in a side chain, is preferred.

In a case where a thermoplastic resin is contained as another polymer (E), such another polymer (E) preferably contains a polar group, such as an ester group, which interacts with a hydroxy group of the copolymer (A). Specifically, a polyester resin or an acryl resin having no curable group is preferred.

In a case where the coating material composition is a powder coating material composition, another polymer (E) is preferably a thermosetting resin. Particularly preferred is one which can be layer-separated without being compatible with the copolymer (A) in the melting or curing process of the powder coating material. If such a thermosetting resin is contained as another polymer (E), at the time of applying the powder coating material containing a powder made of such a coating material composition to a substrate by one coating, then forming a coating film made of a melt of the powder coating material, reacting the reactive components in the coating film, and cooling the coating film for curing, a fluorinated resin layer composed mainly of a cured product of the copolymer (A) contained in the powder, and another resin layer composed mainly of another polymer (E) or its cured product contained in the powder, will be layer-separated.

The thermosetting resin is preferably an acryl resin, a polyester resin, an epoxy resin, an urethane resin, a silicone resin or the like, having thermosetting properties, and from the viewpoint of excellent adhesion to a substrate and from such a viewpoint that the copolymer (A) is less likely to contaminate another resin layer, a polyester resin or an acryl resin is more preferred, and a polyester resin is particularly preferred.

(Medium (F))

The medium (F) may, for example, be water or an organic solvent.

The organic solvent may, for example, be an alcohol, a ketone, an ester, a hydrocarbon or the like.

The alcohol is preferably a $C_{1-10}$ alcohol, and for example, methanol, ethanol, 1-propanol, 2-propanol, 1-butanol, 2-butanol or the like may be mentioned.

The ketone is preferably a $C_{3-10}$ alkyl ketone, and for example, acetone, methyl ethyl ketone, methyl amyl ketone, methyl isobutyl ketone, ethyl isobutyl ketone, diisobutyl ketone, cyclohexanone, isophorone or the like may be mentioned.

The ester is preferably a $C_{2-10}$ ester, and for example, methyl acetate, ethyl acetate, isobutyl acetate, butyl acetate, tert-butyl acetate, methyl propionate, ethyl propionate, ethyl ethoxypropionate or the like may be mentioned.

The hydrocarbon may, for example, be an aromatic hydrocarbon such as xylene or toluene, an aliphatic hydrocarbon mixture represented by mineral spirits, or the like.

As the medium, one of them may be used alone, or two or more of them may be used in combination.

In a case where the coating material composition of the present invention is a solvent-based coating material composition, the coating material composition preferably contains an organic solvent as the medium (F). In such as case, the organic solvent is preferably one which dissolves the copolymer (A).

As such an organic solvent, a compound containing a carbonyl group is preferred, from the viewpoint of excellent solubility of the copolymer (A). As a specific example, the above-mentioned ketone or ester may be mentioned.

In a case where the coating material composition of the present invention is an aqueous coating material composition, the coating material composition preferably contains an aqueous solvent as the medium (F).

The aqueous medium is meant for water only, or a medium composed of water and a small amount of an organic solvent.

The content of the organic solvent in the aqueous medium is preferably form 0 to 10 mass % to the total mass of the aqueous medium. The upper limit for the content of the organic solvent is preferably 3 mass %, more preferably 1 mass %, further preferably 0.5 mass %, particularly preferably 0.3%.

In a case where the aqueous medium contains an organic solvent, the organic solvent is preferably a water-soluble organic solvent which becomes a uniform solution when mixed with water at an optional ratio at room temperature. For example, acetone, methyl ethyl ketone, ethanol or methanol may be mentioned.

(Another Component (G))

Another component (G) is a component which does not belong to any of the copolymer (A), the pigment (B), the curing agent (C), the curing catalyst (D), another polymer (E) and the medium (F).

As such another component (G), various components known as components to be incorporated to coating materials may be employed. For example, the following may be mentioned.

A silane coupling agent.

A light stabilizer such as a hindered amine-type light stabilizer.

An organic ultraviolet absorber, such as a benzophenone-type compound, a benzotriazole-type compound, a triazine-type compound or a cyanoacrylate-type corn pound.

An inorganic ultraviolet absorber, such as zinc oxide or cerium oxide.

A delustering agent such as ultra-fine synthetic silica.

A non-ionic, cationic or anionic surfactant.

A leveling agent.

(Contents of Respective Components in Coating Material Composition)

The content of the copolymer (A) in the coating material composition is preferably from 10 to 75 mass %, more preferably from 20 to 70 mass %, particularly preferably from 25 to 60 mass %, to the solid content (100 mass %) in the coating material composition. When the content of the copolymer (A) is at least the lower limit value in the above range, the weather resistance of the cured film will be excellent. When the content of the copolymer (A) is at most the upper limit value in the above range, it is possible to suppress the cost for the cured film, and further, a sufficient amount of the pigment (B) can be incorporated, whereby the function of the pigment (B) can efficiently be developed.

The solid content in the coating material composition represents the entire amount of the coating material composition, in a case where the coating material composition contains no medium (F), and represents an amount excluding the medium (F) from the entire amount of the coating material composition, in a case where the coating material composition contains the medium (F). The same applies to the solid content in the after-described solvent-based coating material or aqueous coating material.

The content of the pigment (B) in the coating material composition is from 20 to 200 parts by mass, preferably from 40 to 200 parts by mass, more preferably from 40 to 150 parts by mass, particularly preferably from 50 to 150 parts by mass, to 100 parts by mass of the copolymer (A). When the content of the pigment (B) is at least the lower limit value in the above range, the function of the pigment (B) can efficiently be developed. When the content of the pigment (B) is at most the upper limit value in the above range, it is readily possible to obtain a cured film excellent in the flooding/color separation resistance and excellent also in weather resistance.

In a case where the coating material composition contains the curing agent (C), the content of the curing agent (C) in the coating material composition is preferably adjusted to be such that the ratio of the number of moles of the reactive groups in the curing agent (C) to the number of moles of the curable groups in the copolymer (A) (reactive groups/curable groups) would be preferably from 0.1 to 1.2. Such a molar ratio is more preferably from 0.2 to 1.1, particularly preferably from 0.3 to 1.1. When the content of the curing agent (C) is at least the lower limit value in the above range, the curing degree of the coating material becomes high, and the adhesion between the cured film and the substrate, the hardness, chemical resistance, etc. of the cured film will be excellent. When the content of the curing agent (C) is at most the upper limit value in the above range, the cured film tends to be less likely to be brittle, and the weather resistance, heat resistance, chemical resistance, moisture resistance, etc. of the cured film will be excellent.

In a case where the coating material composition contains the curing catalyst (D), the content of the curing catalyst (D) in the coating material composition is preferably from 0.00001 to 10 mass %, to the solid content (100 mass %) in the coating material composition. When the content of the curing catalyst (D) is at least the lower limit value in the above range, the catalyst effects can easily be sufficiently obtainable. When the content of the curing catalyst (D) is at most the upper limit value in the above range, it is readily possible to form a cured film excellent in heat resistance and moisture resistance.

In a case where the coating material composition contains another polymer (E), the content of another polymer (E) in the coating material composition is preferably from 10 to 90 parts by mass, more preferably from 20 to 80 parts by mass, particularly preferably from 25 to 75 parts by mass, to 100 parts by mass of the total of the copolymer (A) and another polymer (E) in the coating material composition. When the content of another polymer (E) is at least the above lower limit value, it is possible to suppress the cost for the cured film. When the content of another polymer (E) is at most the above upper limit value, the weather resistance of the cured film will be excellent.

The content of the medium (F) in the coating material composition is suitably decided in consideration of e.g. the application of the coating material composition, the solubility of the copolymer (A), etc.

The content of the total of another component (G) in the coating material composition is preferably at most 45 mass %, particularly preferably at most 30 mass %, to the solid content (100 mass %) in the coating material composition.

(Applications of Coating Material Composition)

The coating material composition of the present invention is useful as various coating materials such as a solvent-based coating material, an aqueous coating material, a powder coating material, etc., or as a raw material therefor.

In a case where the coating material composition of the present invention contains an organic solvent, such a coating material composition may be used as it is, as a solvent-based coating material. As the case requires, an organic solvent, the curing agent (C), the curing catalyst (D), another polymer (E), another component (G), etc. may be added to such a coating material composition, to obtain a solvent-based coating material.

In a case where the coating material composition of the present invention contains an aqueous medium, such a coating material composition may be used as it is, as an aqueous coating material. As the case requires, an aqueous medium, the curing agent (C), the curing catalyst (D), another polymer (E), another component (G), etc. may be added to such a coating material composition, to obtain an aqueous coating material.

The coating material composition of the present invention may be powdered by a known method. In such a case, the obtainable powder may be used as it is, as a powder coating material. Such a powder may be mixed with another powder to obtain a powder coating material.

[Solvent-Based Coating Material]

A solvent-based coating material of the present invention is one containing the above-described coating material composition, and comprises the copolymer (A), the pigment (B) and an organic solvent.

The solvent-based coating material of the present invention may contain, as the case requires, the curing agent (C), the curing catalyst (D), another polymer (E), another component (G), etc.

These respective components are the same as those mentioned above.

The content of an organic solvent in the solvent-based coating material is suitably decided so that a desired solid content concentration is obtainable in consideration of e.g. the solubility of the copolymer (A), the viscosity of the solvent-based coating material, the coating method, etc.

The solid content concentration in the solvent-based coating material is preferably from 25 to 80 mass %, particularly preferably from 35 to 75 mass %.

The preferred ranges of the contents of the respective components other than the organic solvent, in the solvent-based coating material, are the same as the preferred ranges of the contents of the respective components in the coating material composition.

In a case where the solvent-based coating material of the present invention contains a curing agent (C), the solvent-based coating material of the present invention may be made to be a two liquid type coating material composition, whereby the curing agent (C) is added to a composition containing the copolymer (A) and not containing the curing agent (C) immediately before forming a cured film, or may be made to be a one liquid type coating material composition containing the copolymer (A) and the curing agent (C) together.

A preferred blend formulation for such a one liquid type solvent-based coating material composition may, for example, be a formulation comprising, in 100 mass % of the entire coating material composition, from 30 to 70 mass % of the polymer (A), from 10 to 50 mass % of the pigment (B), from 5 to 40 mass % of the curing agent (C), from 0.0001 to 0.1 mass % of the curing catalyst (D), from 0 to 10 mass % of another polymer (E), from 0 to 5 mass % of another component (G) and the rest being the medium (F).

The coating material composition of the present invention is suitable as a one liquid type coating material composition containing neither the curing agent (C) nor the curing catalyst (D). That is, the solvent-based coating material of the present invention is preferably a one liquid type embodiment which comprises the copolymer (A), the pigment (B) and an organic solvent and may optionally contain another polymer (E) and another component (G) and which contains neither the curing agent (C) nor the curing catalyst (D). Such an embodiment is excellent in the storage stability, since it contains no curing agent (C).

Particularly, in the present invention, since the glass transition temperature (Tg) of the copolymer (A) is high, even if no curing agent (C) is contained, the tackiness of the coating film formed by applying the coating material is low.

The form of the coating material may be a common liquid coating material (a form to be applied by a brush, a roller, etc.) or an aerosol coating material (a form to be applied by a spray).

A preferred blend formulation for such a one liquid type coating material composition containing neither the curing agent (C) nor the curing catalyst (D) may, for example, be a formulation comprising, in 100 mass % of the entire coating material composition, from 25 to 45 mass % of the polymer (A), from 10 to 40 mass % of the pigment (B), 0 mass % of the curing agent (C), 0 mass % of the curing catalyst (D), from 0 to 10 mass % of another polymer (E), from 0 to 5 mass % of another component (G), and the rest being the medium (F).

(Method for Producing Solvent-Based Coating Material)

The solvent-based coating material of the present invention may, for example, be obtained by mixing the copolymer (A), the pigment (B) and the organic solvent, and, as the case requires, the curing agent (C), the curing catalyst (D), another polymer (E), another component (G), etc. The mixing order of the respective components is not particularly limited.

As the method for mixing the components, a method commonly used for the production of a solvent-based coating material may be employed. For example, a method of using a ball mill, a paint shaker, a sand mill, a jet mill, a rocking mill, an attritor, a triple roll, a kneader, etc. may be mentioned.

[Aqueous Coating Material]

The aqueous coating material of the present invention is one containing the above-described coating material composition, and comprises the copolymer (A), the pigment (B) and an aqueous medium.

The aqueous coating material of the present invention may contain, as the case requires, the curing agent (C), the curing catalyst (D), another polymer (E), another component (G), etc.

These respective components are the same as those mentioned above.

The content of an aqueous medium in the aqueous coating material is suitably decided so that a desired solid content concentration is obtainable in consideration of e.g. the dispersibility of the copolymer (A), the viscosity of the aqueous coating material, the coating method, etc.

The solid content concentration in the aqueous coating material is preferably from 25 to 80 mass %, particularly preferably from 35 to 75 mass %.

The preferred ranges of the contents of the respective components other than the aqueous medium, in the aqueous coating material, are the same as the preferred ranges of the contents of the respective components in the coating material composition.

In a case where the aqueous coating material of the present invention contains a curing agent (C), the aqueous coating material of the present invention may be made to be a two liquid type coating material composition, whereby the curing agent (C) is added to a composition containing the copolymer (A) and not containing the curing agent (C) immediately before forming a cured film, or may be made to be a one liquid type coating material composition containing the copolymer (A) and the curing agent (C) together.

A preferred blend formulation for such a one liquid type aqueous coating material composition may, for example, be a formulation comprising, in 100 mass % of the entire coating material composition, from 30 to 70 mass % of the polymer (A), from 10 to 50 mass % of the pigment (B), from 5 to 40 mass % of the curing agent (C), from 0.0001 to 0.1 mass % of the curing catalyst (D), from 1 to 10 mass % of another polymer (E), from 0 to 5 mass % of another component (G) and the rest being the medium (F).

(Method for Producing Aqueous Coating Material)

The aqueous coating material of the present invention may, for example, be obtained by mixing the copolymer (A), the pigment (B) and the aqueous medium, and, as the case requires, the curing agent (C), the curing catalyst (D), another polymer (E), another component (G), etc. The mixing order of the respective components is not particularly limited.

As the method for mixing the components, a method commonly used for the production of an aqueous coating material may be employed. For example, a method of using a ball mill, a paint shaker, a sand mill, a jet mill, a rocking mill, an attritor, a triple roll, a kneader, etc. may be mentioned.

[Powder Coating Material]

The powder coating material of the present invention contains a powder (hereinafter referred to also as a "powder (X)") made of the above-described coating material composition of the present invention.

The powder coating material of the present invention may further contain another powder (hereinafter referred to also as a "powder (Y)") other than the powder (X), as the case requires.

(Powder (X))

The powder (X) is made of a coating material composition (hereinafter referred to also as a "composition ($\alpha$)") which comprises the copolymer (A) and the pigment (B) and which may contain, as the case requires, the curing agent (C), the curing catalyst (D), another polymer (E), another component (G), etc.

These respective components are the same as those mentioned above.

The preferred ranges of the contents of the respective components in the composition ($\alpha$) are the same as the preferred ranges of the contents of the respective components in the coating material composition.

As the powder (X), one type may be used alone, or two or more types may be used in combination.

The content of the powder (X) in the powder coating material of the present invention is preferably from 20 to 100 mass %, more preferably from 35 to 100 mass %, further preferably from 50 to 100 mass %, particularly preferably from 75 to 100 mass %. The powder coating material may be a coating material composed solely of the powder (X). The larger the content of the powder (X), the better the weather resistance of the cured film.

(Powder Y)

The powder (Y) may, for example, be a powder made of a coating material composition (hereinafter referred to also as a composition ($\beta$)) which contains another polymer (E) other than the copolymer (A) and which contains no copolymer (A).

The composition ($\beta$) may contain, as the case requires, the pigment (B), the curing agent (C), the curing catalyst (D), another component (G), etc.

These respective components are the same as those mentioned above.

The preferred ranges of the contents of the respective components in the composition ($\beta$) are the same as the preferred ranges of the respective components in the coating material composition.

As the powder (Y), one type may be used alone, or two or more types may be used in combination.

A preferred blend formulation for such a powder coating material composition may, for example, be a formulation comprising, in 100 mass % of the entire coating material composition, from 30 to 70 mass % of the polymer (A), from 10 to 50 mass % of the pigment (B), from 5 to 40 mass % of the curing agent (C), from 0.0001 to 0.1 mass % of the curing catalyst (D), from 0 to 10 mass % of another polymer (E), and from 0 to 5 mass % of another component (G).

(Process for Producing Powder Coating Material)

The powder coating material of the present invention may, for example, be produced by a production process having the following step (a), step (b), step (c) and step (d).

(a) A step of melt-kneading the composition ($\alpha$) to obtain a kneaded product made of the composition ($\alpha$).

(b) A step of pulverizing the kneaded product to obtain a powder (X).

(c) A step of classifying the powder (X), as the case requires.

(d) A step of dry-blending the powder (X) and the powder (Y), as the case requires.

<Step (a)>

The respective components are mixed to prepare a composition ($\alpha$), and then, the composition ($\alpha$) is melt-kneaded to obtain a kneaded product having the respective components made uniform.

It is preferred that the respective components are preliminarily pulverized in a powder form.

The apparatus to be used for melt-kneading may, for example, be a single screw extruder, a twin screw extruder, a planetary gear, etc.

The kneaded product is preferably pelletized after being cooled.

<Step (b)>

The apparatus to be used for pulverization may be a pulverizer such as a pin mill, a hammer mill, a jet mill, etc.

<Step (c)>

It is preferred to carry out classification after the pulverization in order to remove a powder with a particle size being too large or a powder with a particle size being too small. When classification is to be carried out, it is preferred to remove at least either particles with a particle size being less than 10 µm or particles with a particle size exceeding 100 µm.

The method for classification may, for example, be a method of sieving or an air classification method.

The average particle size of the powder (X) is, for example, preferably from 25 to 50 µm by a 50% average volume particle size distribution. The measurement of the particle size of the powder is usually carried out by means of a particle size measuring device of a type of capturing a potential change during passing through a narrow pore, a laser diffraction system, an image judging system, a sedimentation rate-measuring system, etc.

<Step (d)>

The apparatus to be used for dry blending may, for example, be a high speed mixer, a double cone mixer, a kneader, a tumbler mixer, a mixing shaker, a drum shaker, a rocking shaker, etc.

[Coated Article]

The coated article of the present invention has, on a surface of a substrate, a cured film formed by using the solvent-based coating material, the aqueous coating material or the powder coating material (these may generally be referred to simply as a "coating material") of the present invention.

(Substrate)

The shape, size, etc. of the substrate are not particularly limited.

The material for the substrate is not particularly limited, and for example, a metal, glass, a resin, wood, etc. may be mentioned.

The metal may, for example, be aluminum, iron, magnesium, etc. Aluminum is particularly preferred, since it is excellent in corrosion resistance and light in weight and has excellent properties in application as building materials.

The glass is not particularly limited, and known glass may be employed, and for example, soda lime glass, alkali aluminosilicate glass, borosilicate glass, alkali-free glass, crystal glass, quartz glass, etc. may be mentioned. Such glass may be chemically tempered.

The resin may be a fluorinated resin or a non-fluorinated resin. A non-fluorinated resin is preferred from the viewpoint of usefulness by forming a cured film by using the coating material of the present invention.

The non-fluorinated resin may, for example, be a vinyl-type resin, a polyester resin, a polyether-type resin, a polyamide resin, a thermoplastic polyimide resin, a thermoplastic elastomer, etc.

In the resin, an additive may be incorporated. As the additive, a known additive may be employed, and an inorganic filler or an organic filler may be used, or they may be used in combination.

Surface treatment may be applied to the surface of the substrate, with a view to improving the adhesion of the cured film. The surface treatment may, for example, be corona discharge treatment, plasma discharge treatment, treatment with a silane coupling agent, etc.

(Process for Producing Coated Article)

The coated article of the present invention may be produced by a production process comprising the following step (e) and step (f).

(e) A step of applying the coating material to a substrate to form a coating film.

(f) A step of curing the coating film to form a cured film.

<Step (e)>

As the coating method of the coating material, a known coating method may suitably be employed in consideration of e.g. the type of the coating material, the shape of the substrate, etc.

As a coating method in a case where the coating material is a solvent-based coating material or an aqueous coating material, various wet coating methods may be employed, and for example, fluid immersion coating, roll coating, air spray coating, air-less spray coating, electrodeposition coating, etc. may be mentioned.

In a case where the coating material is a powder coating material, a coating film made of a melt of the powder coating material is formed by application. The coating film made of the melt of the powder coating material may be formed at the same time as application of the powder coating material to the substrate, or it may be formed, after depositing the powder of the powder coating material on the substrate, by heat-melting the powder on the substrate. Substantially at the same time as the powder coating material is heat-melted, the curing reaction of the reactive components in the composition will start, and therefore, it is necessary to conduct the heat-melting of the powder coating material and the deposition on the substrate substantially at the same time, or to conduct heat-melting of the powder coating material after deposition of the powder coating material on the substrate.

In a case where the coating material is a powder coating material, the coating method may, for example, be an electrostatic coating method, an electrostatic spraying method, an electrostatic immersion method, a misting method, a fluid immersion method, an atomizing method, a spraying method, a thermal spraying method, a plasma-spraying method, etc.

<Step (f)>

In a case where the coating material is a solvent-based coating material or an aqueous coating material, the method for curing the coating film may, for example, be a method of heating by using a heating means such as an infrared drying furnace or a hot air circulation dryer. The heating temperature of the coating film (the curing temperature) is preferably from 40 to 250° C., more preferably from 50 to 230° C.

In a case where the coating material is a powder coating material, substantially at the same time as the powder coating material is heat-melted in step (e), the curing reaction of the reactive components in the composition will start. In step (f), the coating film in a molten state is cooled to room temperature (20 to 25° C.) to form a cured film.

The thickness of the cured film is not particularly limited, but is preferably from 10 to 200 μm, more preferably from 20 to 100 μm, particularly preferably from 30 to 80 μm. When the thickness of the cured film is at least the lower limit value in the above range, a cured film free from pinholes and excellent in weather resistance will be obtainable, and when it is at most the upper limit value, it is possible to suppress the coating cost.

Advantageous Effects

By the coating material composition, the solvent-based coating material, the aqueous coating material or the powder coating material of the present invention, it is possible to improve the flooding/color separation resistance and weather resistance. Particularly, as the alternate copolymerization rate of units (1) and units (2) in the copolymer (A) is high, the above effects will be high, and the effects for improving the weather resistance will be particularly high.

The reason as to why such effects are obtainable is not clearly understood, but the degree of acidity of hydroxy groups being high is considered to be influential. That is, in a unit (2), a hydroxy group is directly bonded to a carbon atom in the main chain. In the copolymer (A), a structure having —$CF_2$— of a unit (1) bonded to the carbon atom to which such a hydroxy group is bonded (i.e. —$CF_2$—CH(OH)—) is present. The acidity of the hydroxy group directly bonded to the carbon atom to which —$CF_2$— is bonded, is as high as equal to phenol. As the acidity is high, the dispersibility of the pigment (B) will be improved. Further, the reactivity with the curing agent (C) becomes mild, and it is possible to suppress being excessively cured even if the hydroxy value is made high, whereby the flooding or color separation is considered to be prevented. Further, as the alternate copolymerization ratio is high, hydroxyl groups are uniformly distributed in the molecule of the copolymer (A). Therefore, the distribution of hydroxy groups in the coating film will be uniform, and the cross-linking reaction is less likely to be localized, whereby the weather resistance of the cured film is considered to be improved.

EXAMPLES

Now, the present invention will be described in detail with reference to Examples. However, the present invention is by no means limited by the following description. Here, "%" of the solid content represent "mass %". The materials and evaluation methods used, are shown below.

[Materials Used]

Copolymer (A1): A fluorinated copolymer of tetrafluoroethylene/vinyl alcohol=50/50 (mol %) (mass average molecular weight (Mw): 29,000, number average molecular weight (Mn): 18,000, molecular weight distribution (Mw/Mn): 1.6, hydroxy value: 390 mgKOH/g, alternate copolymerization ratio: at least 95%), obtained in Synthesis Example 1.

Copolymer (A2): A fluorinated copolymer of tetrafluoroethylene/vinyl alcohol=50/50 (mol %) (mass average molecular weight (Mw): 275,000, number average molecular weight (Mn): 74,000, molecular weight distribution (Mw/Mn): 3.3, hydroxy value: 390 mgKOH/g, alternate copolymerization ratio: from 80 to 85%), obtained in Synthesis Example 2.

Copolymer (H1): A fluorinated polymer of tetrafluoroethylene/hydroxyethyl allyl ether/vinyl versatate/vinyl benzoate/vinyl acetate=43/13/32/6/6 (mol %) (mass average molecular weight (Mw): 34,000, number average molecular weight (Mn): 12,000, molecular weight distribution (Mw/Mn): 2.8, hydroxy value: 55 mgKOH/g), produced based on the disclosure in JP-B-7-110890.

Pigment (B1): titanium oxide (trade name: "D-918", manufactured by Sakai Chemical Industry Co., Ltd.)

Pigment (B2): phthalocyanine blue (trade name: "PV Fast Blue A2R", manufactured by Clariant Japan)

Curing agent (C1): HDI isocyanurate type polyisocyanate resin (trade name: "Colonate HX, manufactured by Nippon Polyurethane Industry Co., Ltd.)

Curing catalyst (D1): dibutyltin dilaurate Cellulose derivative: cellulose acetate butyrate (CAB) (trade name: "EASTMAN CAB", manufactured by Eastman Chemical Company)

Surface conditioner (E1): BYK (registered trademark)-130, manufactured by BYK Japan KK Surface conditioner (E2): BYK (registered trademark)-161, manufactured by BYK Japan KK

[Evaluation Methods]

(Mass Average Molecular Weight (Mw), Number Average Molecular Weight (Mn) and Molecular Weight Distribution (Mw/Mn) of Copolymer (A))

The mass average molecular weight (Mw), number average molecular weight (Mn) and molecular weight distribution (Mw/Mn) of a copolymer obtained in each Example were measured by polystyrene gel-calculated gel permeation chromatography (GPC) by using a high performance GPC apparatus "HLC-8220GPC", manufactured by Tosoh Corporation. As the eluent, tetrahydrofuran was used. With respect to columns, as a guard column, TSKgel guardcolumn MP (trade name) was used, and as analysis columns, two TSKgel Multipore HXL-M (trade name) were connected in series for use (manufactured by Tosoh Corporation). The column temperature was set to be 40° C.

(Water Contact Angle)

With respect to a cured film-attached test plate prepared, a contact angle at the time when a droplet of water was dropped on the surface of the cured film in air, was measured by means of a contact angle meter (CA-X Model, manufactured by Kyowa Interface Science Co., Ltd.). The smaller the water contact angle, the higher the hydrophilicity. The amount of the droplet of water was about 1 µL, and the measurement temperature was 23° C.

(Adhesion to Substrate)

With respect to a cured film-attached test plate prepared, the adhesion of the cured film to the substrate was evaluated by a method in accordance with JIS K5600-5-6: 1999 (Coating material common test methods-Part 5: Mechanical properties of coating film-Section 6: Adhesive Property (cross-cut method)).

○ (good): No peeling of the cured film was observed.

× (no good): Peeling of the cured film was observed.

(Corrosiveness of Substrate)

With respect to a cured film-attached test plate prepared, formation of rust on the substrate was confirmed by a method in accordance with JIS K5600-7-1: 1999 (Coating material common test methods-Part 7: Long period durability of coating film-Section 1: Resistance to Neutral Salt Spray).

○ (good): No rust water was observed from a scratched portion.

Δ (permissive): Rust water was slightly observed from a scratched portion.

× (no good): A large amount of rust water was observed from a scratched portion.

(Accelerated Weathering Test)

With respect to a cured film-attached test plate prepared, an accelerated weathering test by exposure for 5,000 hours (exposure conditions: JIS-K-5600-7-8) was conducted by using Accelerated Weathering Tester (Model: OUV/SE, manufactured by Q-PANEL LAB PRODUCTS).

By comparing the initial stage and after the exposure for 5,000 hours, the gloss retention rate and the presence or absence of peeling of the cured film were evaluated.

<1. Gloss Retention Rate of Cured Film>

The gloss at the surface of a cured film was measured by using PG-1 M (a gloss meter, manufactured by Nippon Denshoku Industries Co., Ltd, and the weather resistance was evaluated in accordance with the following standards.

○ (good): The gloss retention rate was at least 80%.

Δ (permissive): The gloss retention rate was at least 60% and less than 80%.

× (no good): The gloss retention rate was less than 60%.

<2. Presence or Absence of Peeling of Cured Film>

The weather resistance was evaluated in accordance with the following standards.

○ (good): No peeling of the cured film was observed.

× (no good): Peeling of the cured film was observed.

(Evaluation of Flooding/Color Separation Resistance)

0.1 g of an evaluation sample was sandwiched between a slide glass and a cover glass and observed by a microscope under 500 magnifications, whereby the evaluation was made in accordance with the following standards.

○ (good): No formation of Bennard cells was observed.

× (no good): Formation of Bennard cells was observed.

Synthesis Example 1: Synthesis of Copolymer (A1)

<Polymerization Step>

Into a stainless steel autoclave equipped with a stirrer and having an internal capacity of 1 L (liter), 317 g of tert-butyl alcohol, 111 g of tert-butyl vinyl ether (hereinafter referred to also as "t-BuVE"), 0.98 g of potassium carbonate and 2.72 g of a 50% 1,1,1,2,2,3,3,4,4,5,5,6,6-tridecafluorohexane solution of tert-butyl peroxypivalate (hereinafter referred to also as "PBPV") were charged, and freeze-drying was carried out with liquefied nitrogen to remove oxygen in the system. Then, 113 g of tetrafluoroethylene (hereinafter referred to also as "TFE") was introduced into the autoclave, followed by heating to 55° C. The pressure at that time was 1.62 MPa. Thereafter, the reaction was continued for 8 hours, and when the pressure lowered to 0.86 MPa, the autoclave was cooled with water, and an unreacted gas was purged to terminate the reaction. The obtained polymerization solution was put into methanol, and a formed copolymer was precipitated, followed by vacuum drying to obtain copolymer (P1) as solid. The amount of the copolymer (P1) was 122 g, and the yield was 56%.

Of the obtained copolymer (P1), Mw was 29,000, Mn was 18,000, and Mw/Mn was 1.6. From the $^1$H NMR spectrum and $^{19}$F NMR spectrum, the copolymer composition ratio was found to be TFE/t-BuVE=50/50 (mol %). Further, by calculation from the copolymerization reactivity ratio of TFE and t-BuVE, the alternate copolymerization ratio of the copolymer (P1) was at least 95%, and thus, the copolymer was found to have a substantially alternate structure.

<Deprotection Step>

Into a 5 L flask, 118 g of the above copolymer (P1), 118 g of 36 mass % concentrated hydrochloric acid and 1,540 g of ethanol were charged and then, heated and stirred at the inner temperature of 78° C. to carry out a deprotection reaction. After continuing the reaction for 8 hours, the reaction solution was dropped into water to precipitate the copolymer, followed by washing with water and then by vacuum drying at 90° C., to obtain 80 g of copolymer (A1).

The 1H NMR spectrum was measured, whereby it was confirmed that in the copolymer (A1), at least 99% of the protective groups (tert-butyl groups derived from t-BuVE) were detached to form hydroxy groups.

Synthesis Example 2: Synthesis of Copolymer (A2)

<Polymerization Step>

Into a stainless steel autoclave equipped with a stirrer and having an internal capacity of 1 L (liter), 354 g of methyl acetate, 63 g of vinyl acetate (hereinafter referred to also as "VAc") and 2.3 g of a 50% 1,1,1,2,2,3,3,4,4,5,5,6,6-tridecafluorohexane solution of PBPV were charged, and freeze-drying was carried out with liquefied nitrogen to remove oxygen in the system. Then, 179 g of TFE was introduced into the autoclave, followed by heating to 55° C. Thereafter, the reaction was continued for 10 minutes, then the autoclave was cooled with water, and an unreacted gas was purged to terminate the reaction. The obtained polymerization solution was put into methanol, and a formed copolymer was precipitated, followed by vacuum drying to obtain copolymer (P2) as solid. The amount of the copolymer (P2) was 110 g, and the yield was 45%.

Of the obtained copolymer (P2), Mw was 278,000, Mn was 84,000, and Mw/Mn was 3.3. From the $^1$H NMR spectrum and $^{19}$F NMR spectrum, the copolymer composition ratio was found to be TFE/VAc=50/50 (mol %). Further, by calculation from the copolymerization reactivity ratio of both monomers, the alternate copolymerization ratio of the copolymer (P2) was from 80 to 85%.

<Deprotection Step>

Into a 1 L flask, 40 g of the above copolymer (P2), 41 g of 36 mass % concentrated hydrochloric acid and 520 g of ethanol were charged and then, heated and stirred at the inner temperature of 78° C. to carry out a deprotection reaction. After continuing the reaction for 32 hours, the reaction solution was dropped into water to precipitate the copolymer, followed by washing with water and then by vacuum drying at 90° C., to obtain 27 g of copolymer (A2).

The 1H NMR spectrum was measured, whereby it was confirmed that in the copolymer (A2), at least 99% of the acetyl groups were detached to form hydroxy groups.

Example 1

<Production of Solvent-Based Coating Material>

The copolymer (A1) was dissolved in butyl acetate to obtain a butyl acetate solution of the copolymer (A1) (solid content: 60%).

To 83 g of the above butyl acetate solution of the copolymer (A1) (solid content: 60%), 200 g of the pigment (B1), 43 g of xylene and 43 g of butyl acetate were added, and further, 369 g of glass beads having a diameter of 1 mm were put, followed by stirring for 2 hours by a paint shaker.

After the stirring, filtration was conducted to remove glass beads, to obtain a pigment composition (1-1) as a coating material composition.

Then, to 100 g of the pigment composition (1-1), 150 g of the above butyl acetate solution of the copolymer (A1) (solid content: 60%), 37.0 g of the curing agent (C1) and the curing catalyst (D1) (one made to be 3 g by diluting with four times of butyl acetate) were further added and mixed to obtain a solvent-based coating material (1).

<Preparation and Evaluation of Cured Film-Attached Test Plate>

On the surface of a SUS 304 stainless steel material having a size of 150 mm×75 mm and a thickness of 3 mm, the solvent-based coating material (1) was applied so that the film thickness after curing would be 40 μm, followed by aging for 1 week in a constant temperature chamber at 25° C. to form a cured film, to obtain a cured film-attached test plate (a coated article).

With respect to the obtained cured film-attached test plate, the water contact angle of the cured film, the adhesion of the cured film to the substrate, the corrosiveness of the substrate and the weather resistance of the cured film, were evaluated. The evaluation results are shown in Table 1.

<Evaluation of Flooding/Color Separation Resistance>

To 23.5 g of the butyl acetate solution of the copolymer (A1) (solid content: 60%), 7.5 g of the pigment (B2) and 76.7 g of butyl acetate were added, and further, 108 g of glass beads having a diameter of 1 mm were put, followed by stirring for 2 hours by a paint shaker. After the stirring, filtration was conducted to remove glass beads, to obtain a pigment composition (1-2).

Then, the pigment composition (1-1) and the pigment composition (1-2) were mixed so that the mass ratio would be 1:1. 0.1 g of the obtained mixture was sandwiched between a slide glass and a cover glass and observed by a microscope under 500 magnifications, whereby evaluation was made in accordance with the following standards. The evaluation results are shown in Table 1. Further, the microscopic image is shown in FIG. 1.

○ (good): No formation of Bennard cells was observed.
× (no good): Formation of Bennard cells was observed.

Example 2

<Production of Solvent-Based Coating Material>

A pigment composition (2-1) was obtained by carrying out the preparation of the pigment composition in the same manner as in Example 1 except that instead of the copolymer (A1), the copolymer (A2) was used, and the solid content was changed to 50%. A solvent-based coating material (2) was obtained by carrying out the preparation of the solvent-based coating material (1) in the same manner as in Example 1 except that instead of the pigment composition (1-1), the pigment composition (2-1) was used.

<Preparation and Evaluation of Cured Film-Attached Test Plate>

A cured film-attached test plate was prepared in the same manner as in Example 1, except that instead of the solvent-based coating material (1), the solvent-based coating material (2) was used, and the water contact angle of the cured film, the adhesion of the cured film to the substrate, the corrosiveness of the substrate and the weather resistance of the cured film, were evaluated. The evaluation results are shown in Table 1.

<Evaluation of Flooding/Color Separation Resistance>

A pigment composition (2-2) was obtained by carrying out the preparation of the pigment composition (1-2) in the same manner as in Example 1, except that instead of the copolymer (A1), the copolymer (A2) was used, and the solid content was changed to 50%.

The flooding/color separation resistance was evaluated in the same manner as in Example 1, except that instead of the pigment composition (1-1) and the pigment composition (1-2), the pigment composition (2-1) and the pigment composition (2-2), were used. The evaluation results are shown in Table 1.

Comparative Example 1

<Production of Solvent-Based Coating Material>

The copolymer (H1) was dissolved in xylene to obtain a xylene solution of the copolymer (H1) (solid content: 60%).

A pigment composition (3-1) was obtained by carrying out the preparation of a pigment composition in the same manner as in Example 1, except that instead of the butyl acetate solution of the copolymer (A1) (solid content: 60%), the above xylene solution of the copolymer (H1) (solid content: 60%) was used.

Then, to 100 g of the pigment composition (3-1), 150 g of the above xylene solution of the copolymer (H1) (solid content: 60%), 19.4 g of the curing agent (C1) and the curing catalyst (D1) (one made to be 3 g by diluting with 4 times of butyl acetate) were further added, to obtain a solvent-based coating material (3).

<Preparation and Evaluation of Cured Film-Attached Test Plate>

A cured film-attached test plate was prepared in the same manner as in Example 1, except that instead of the solvent-based coating material (1), the solvent-based coating material (3) was used, and the water contact angle of the cured film, the adhesion of the cured film to the substrate, the corrosiveness of the substrate and the weather resistance of the cured film, were evaluated. The evaluation results are shown in Table 1.

<Evaluation of Flooding/Color Separation Resistance>

To 23.5 g of the xylene solution of the copolymer (H1) (solid content: 60), 7.5 g of the pigment (B2) and 76.7 g of butyl acetate were added, and further, 108 g of glass beads having a diameter of 1 mm were put, followed by stirring for 2 hours by a paint shaker. After the stirring, filtration was conducted to remove glass beads, to obtain a pigment composition (3-2).

Figure 2:
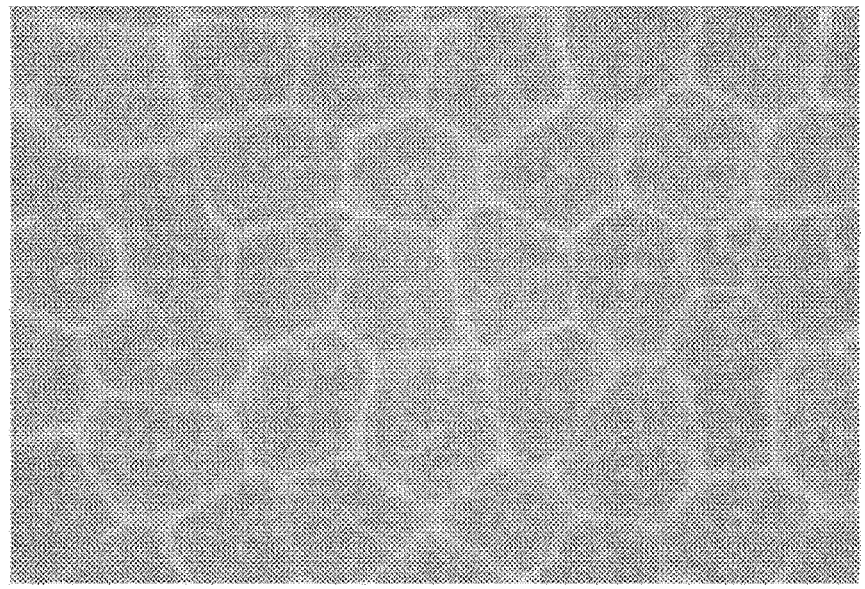
FIG. 2 is a microscopic image (500 magnifications) showing the result of evaluation of flooding/color separation resistance in Comparative Example 1.

The flooding/color separation resistance was evaluated in the same manner as in Example 1, except that instead of the pigment composition (1-1) and the pigment composition (1-2), the pigment composition (3-1) and the pigment composition (3-2), were used. The evaluation results are shown in Table 1. Further, its microscopic image is shown in FIG. 2.

Here, in Examples 1 and 2, the blend amount of the curing agent (C1) is sterically congested, and therefore, on the assumption that a ¼ amount of hydroxy groups contained in the copolymer (A1) would be reacted, the molar ratio of the hydroxy groups to the reactive groups of the curing agent was decided to correspond to Comparative Example 1.

TABLE 1

| | Example 1 | Example 2 | Comparative Example 1 |
|---|---|---|---|
| Flooding/color separation resistance | ○ | ○ | x |
| Water contact angle | 79.3 | 80.7 | 82.9 |

TABLE 1-continued

| | Example 1 | Example 2 | Comparative Example 1 |
|---|---|---|---|
| Adhesion to substrate | ○ | ○ | x |
| Corrosiveness of substrate | ○ | ○ | ○ |
| Accelerated weather resistance test | | | |
| 1. Gloss retention rate of cured film | ○ | Δ | x |
| 2. Presence or absence of peeling of cured film | ○ | ○ | x |

In Examples 1 and 2, as shown in Table 1 and FIG. 1, no color separation (no formation of Bennard cells) was observed. Further, the formed cured films were excellent in adhesion to the substrate, and their weather resistance was also good. The weather resistance of the cured film in Example 1 was particularly excellent.

On the other hand, in Comparative Example 1, as shown in Table 1 and FIG. 2, color separation was observed. Further, the formed cured film was poor in weather resistance and adhesion to the substrate.

Example 3

<Production of Aerosol Coating Material Composition>

The copolymer (A1) was dissolved in butyl acetate to obtain a butyl acetate solution of the copolymer (A1) (solid content: 60%).

To 58.3 g of the above butyl acetate solution of the copolymer (A1) (solid content: 60%), 22.8 g of the pigment (B1), 12.4 g of methoxypropyl acetate, 3.2 g of cellulose acetate butyrate (CAB) (E3), 2.4 g of the surface conditioner (E1) and 0.9 g of the surface conditioner (E2) were added, and further, 200 g of glass beads having a diameter of 1 mm were put, followed by stirring for 2 hours by a paint shaker. After the stirring, filtration was conducted to remove glass beads to obtain an aerosol coating material composition (1).

Then, 90 mL of this aerosol coating material composition (1) was filled in a tin can, and then, as a spraying agent, 210 mL of dimethyl ether was sealed in to obtain an aerosol coating material (A1).

Example 4

An aerosol coating material (A2) was obtained in the same manner as in Example 3 except that 22.8 g of the pigment (B1) was changed to a combined use of 11.4 g of the pigment (B1) and 11.4 g of the pigment (B2).

Comparative Example 2

<Production of Aerosol Coating Material Composition>

An aerosol coating material (B) was obtained by carrying out the preparation of an aerosol coating material composition in the same manner as in Example 3 except that instead of the copolymer (A1), the copolymer (H1) was used.

<Coating Material Evaluation and Coating Film Evaluation>

On the surface of a stainless steel material (JIS-SUS 304) having a size of 150 mm×75 mm and a thickness of 3 mm, the aerosol coating material (A) or (B) was applied by spraying at a coating rate of 125 g/m². By aging for one week in a constant temperature chamber at 25° C. (humidity: 50% RH), a coating film was formed to obtain a coating film-attached test plate (a coated article). With respect to the obtained coating film-attached test plate, non-tackiness of the coating film was evaluated.

<Spraying Property>

The aerosol coating material was applied by spraying for 10 seconds, whereby the state of mist was visually observed. A state of mist with no problem as an aerosol coating material (a case where the pigment dispersibility is good), was judged to be ○ (good). A state of mist with a problem as an aerosol coating material, such as coarse mist (a case where the pigment dispersibility is poor), was judged to be × (no good).

<Non-Tackiness>

Five gauzes were overlaid on the surface of the coating film of a coating film-attached test plate after aging, and a weight of 500 g was placed at the center of the gauzes and left to stand at 45° C. for 24 hours in the atmosphere. After being left to stand, the gauzes were pulled away from the coating film surface, whereby the degree of tackiness between the coating film surface and the gauzes, and the impression of gauze weaves, were examined. One free from the tackiness and impression of gauze weaves, was judged to be ○ (good), and one having the tackiness or the impression of gauze weaves observed, was judged to be × (no good).

TABLE 2

|  | Example 3 | Example 4 | Comparative Example 2 |
|---|---|---|---|
| Aerosol coating material | A1 | A2 | B |
| Copolymer | A1 | A1 | H1 |
| Tg of copolymer (° C.) | 70 | 70 | 20 |
| Spraying property | ○ | ○ | x |
| Non-tackiness | ○ | ○ | x |

In Example 3, even though no curing agent was contained in the coating material, tackiness such as stickiness was not observed on the coating film. Further, an impression of the gauze weaves was not observed on the coating film surface after the non-tackiness test. Further, the pigment dispersibility was also good, the state of mist during spray coating was good, and smoothness of the coating film was also excellent.

On the other hand, in Comparative Example 2, since no curing agent was contained in the coating material, stickiness or the like was observed on the coating film. On the coating film surface after the non-tackiness test, the gauzes adhered to the coating film and were difficult to be pulled away, and besides, an impression of gauze weaves remained. Further, the pigment dispersibility was poor, the state of mist during the spray coating was poor, and it was not possible to apply the coating uniformly.

INDUSTRIAL APPLICABILITY

Articles coated with the solvent-based coating material, aqueous coating material and powder coating material, comprising the coating material composition of the present invention, have cured films free from flooding or color separation and excellent in weather resistance, and thus, they are useful in various industrial fields.

This application is a continuation of PCT Application No. PCT/JP2015/056857 filed on Mar. 9, 2015, which is based upon and claims the benefit of priority from Japanese Patent Application No. 2014-046799 filed on Mar. 10, 2014. The contents of those applications are incorporated herein by reference in their entireties.

What is claimed is:

1. A coating material composition, comprising:
a fluorinated copolymer (A); and
a pigment (B),
wherein
the fluorinated copolymer (A) has units represented by the following formula (1) and units represented by the following formula (2),
a number average molecular weight of the fluorinated copolymer (A) is from 10,000 to 100,000,
a hydroxy value of the fluorinated copolymer (A) is at least 100 mgKOH/g, and
a content of the pigment (B) is from 20 to 200 parts by mass, per 100 parts by mass of the fluorinated copolymer (A):

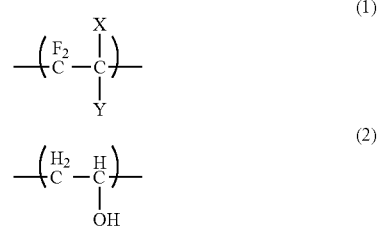

where in the formula (1), X and Y are each independently H, F, $CF_3$ or Cl.

2. The coating material composition according to claim 1, wherein in the formula (1), X is F, and Y is F or Cl.

3. The coating material composition according to claim 1, wherein two or more types of the pigment (B) are used in combination.

4. The coating material composition according to claim 1, wherein the hydroxy value of the fluorinated copolymer (A) is from 100 mgKOH/g to 500 mgKOH/g.

5. The coating material composition according to claim 1, wherein to the total of all units in the fluorinated copolymer (A), the units represented by the formula (1) are from 20 to 80 mol %, and the units represented by the formula (2) are from 80 to 20 mol %.

6. The coating material composition according to claim 1, wherein in the fluorinated copolymer (A), the molar ratio of the units represented by the formula (1) to the units represented by the formula (2) (units (1)/units (2)) is from 40/60 to 60/40.

7. The coating material composition according to claim 1, wherein in the fluorinated copolymer (A), the alternating copolymerization ratio of the units represented by the formula (1) and the units represented by the formula (2), is at least 95%.

8. The coating material composition according to claim 1, further comprising a curing agent (C).

9. The coating material composition according to claim 1, further comprising an organic solvent.

10. The coating material composition according to claim 9, wherein the organic solvent is a compound containing a carbonyl group.

11. The coating material composition according to claim 1, further comprising an aqueous medium.

12. The coating material composition according to claim 1, further comprising an organic solvent,
wherein the coating material composition does not comprise a curing agent (C) or a curing catalyst (D).

13. A powder coating material, comprising:
the coating material composition of claim 1.

14. A coated article, comprising:
a cured film formed from the coating material composition of claim 9, on a surface of a substrate.

15. A coated article, comprising
a cured film formed from the powder coating material of claim 13, on a surface of a substrate.

16. A coating material composition, comprising:
a fluorinated copolymer (A); and
a pigment (B),
wherein the fluorinated copolymer (A) has units represented by the following formula (1) and units represented by the following formula (2),
a number average molecular weight of the fluorinated copolymer (A) is from 10,000 to 100,000,
in the fluorinated copolymer (A), the alternating copolymerization ratio of the units represented by the formula (1) and the units represented by the formula (2), is at least 95%, and
a content of the pigment (B) is from 20 to 200 parts by mass, per 100 parts by mass of the fluorinated copolymer (A):

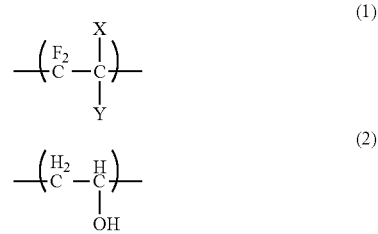

where in the formula (1), X and Y are each independently H, F, $CF_3$ or Cl.

17. The coating material composition according to claim 16, wherein in the formula (1), X is F, and Y is F or Cl.

18. The coating material composition according to claim 16, wherein two or more types of the pigment (B) are used in combination.

19. The coating material composition according to claim 16, further comprising a curing agent (C).

20. The coating material composition according to claim 16, further comprising an organic solvent,
wherein the coating material composition does not comprise a curing agent (C) or a curing catalyst (D).

* * * * *